Feb. 16, 1960            K. BRAND            2,925,093
VALVE PARTICULARLY FOR HYDRAULIC CONTROL SYSTEMS
Filed May 3, 1954            2 Sheets-Sheet 1
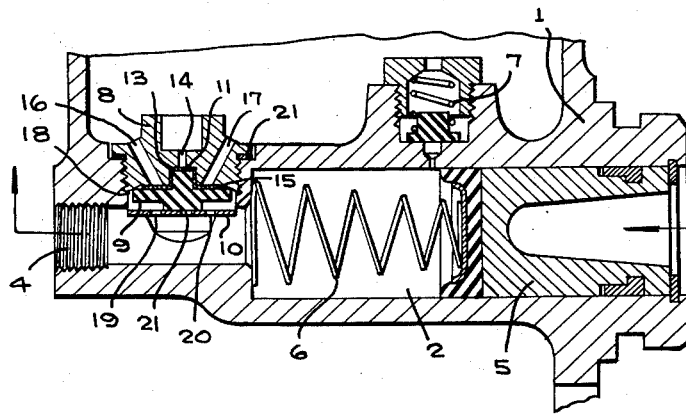
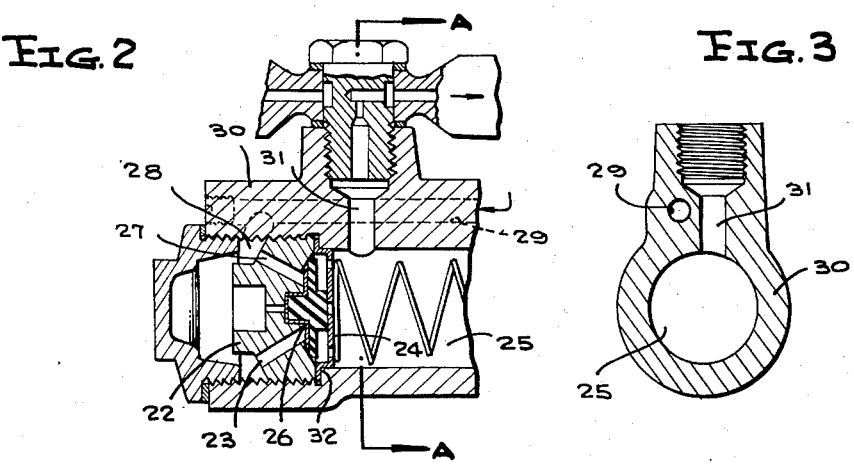
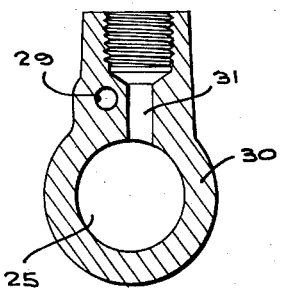
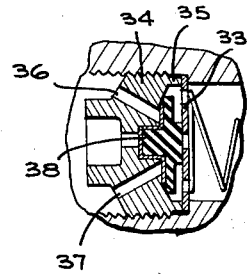
INVENTOR.
KARL BRAND
BY
ATTORNEYS Feb. 16, 1960   K. BRAND   2,925,093
VALVE PARTICULARLY FOR HYDRAULIC CONTROL SYSTEMS
Filed May 3, 1954   2 Sheets-Sheet 2

INVENTOR.
KARL BRAND
BY
Stevens, Davis, Miller & Mosher
ATTORNEYS

United States Patent Office 2,925,093
Patented Feb. 16, 1960

2,925,093

VALVE PARTICULARLY FOR HYDRAULIC CONTROL SYSTEMS

Karl Brand, Ebern, near Bamberg, Germany, assignor to Kugelfischer Georg Schafer & Co., Schweinfurt, Germany Application May 3, 1954, Serial No. 427,277

Claims priority, application Germany May 11, 1953

11 Claims. (Cl. 137—525.3)

In hydraulic brake control systems for automotive vehicles it has frequently been necessary to provide a reliable operating valve between the brake fluid reservoir and the master control cylinder, which latter is adapted to act as a pump. Moreover, there are numerous other applications calling for the use of a valve of the type indicated. In view of the specific demands made of such valves, numerous types of valve have thus far been developed; however, none of the valves heretofore known in the art has combined a sufficiently high degree of reliability in operation with a reasonably low cost of manufacture.

The above-mentioned deficiencies of valves of known construction are eliminated in a valve according to the invention, this valve being characterized by the provision of a valve member made of a suitable elastic organic material, the said valve member being so arranged between the valve body and an apertured supporting member located at a fixed distance from the valve body, the valve member being clamped between the said parts in such a manner that the upper circumference of the valve member co-operates with a suitably shaped portion of the valve body to produce a valve opening or closing action, while the under side of the central portion of said valve member rests on the said apertured supporting member. In a specific embodiment of the invention, there may be provided between the said valve member and the said valve body a sheet-metal washer having a cylindrical centrally located metallic projection adapted to be guided in a conforming recess provided on the under side of the valve body. The use, in a valve of the type indicated, of these features of the invention, while affording the hereinbefore mentioned advantages, will also result in a very compact construction of such a valve.

If the central portion of the valve member is provided, also according to the invention, with a cylindrical base portion facing in a direction towards the said supporting member, it is possible, according to another particularly important feature of the invention, to form the said supporting member as an annular, substantially pot-like member, a central wall portion of which is adapted to guide the said cylindrical base portion of the valve member with the edge of the said central wall portion supporting the valve member proper and the outer rim of the said pot-like member being secured to the said valve body. It will be appreciated that this arrangement offers an important advantage in that it permits the valve of the invention to be constructed as a self-contained unit, thus greatly facilitating its application. It is, of course, understood that the hereinbefore mentioned features of the invention may be used either singly or in any desired combination.

These and other features and characteristics of the invention will be apparent in the following description of certain preferred embodiments taken in conjunction with the accompanying drawings, in which:

Figure 1 is a longitudinal sectional elevation illustrating the principal features of the valve of the invention as well as its arrangement on a master control cylinder;

Figure 2 is a fragmentary sectional elevation resembling the left-hand part of Figure 1 and showing a portion of a master control cylinder with the valve and the passages leading to the working cylinders arranged in a different manner;

Figure 3 is a cross section taken along the line A—A in Figure 2;

Figure 4 illustrates the valve of Figure 2 incorporating slight modifications to the valve body and the supporting member;

Figure 12:
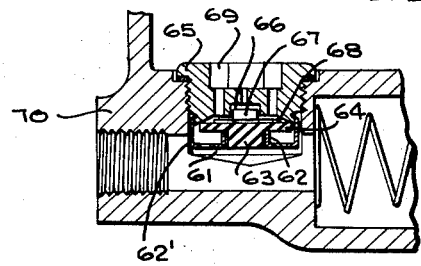

Figures 8, 9, 10 and 11 indicate the manner in which the respective valve members of Figs. 4 to 7 may be simplified by modifying the supporting member in a suitable way;

Figure 12 illustrates the hereinbefore mentioned particularly advantageous embodiment forming a self-contained unit.

As will be seen in Figure 1, the body casting 1 has formed therein the master control cylinder 2 belonging to the hydraulic brake control system of an automotive vehicle, a brake fluid reservoir 3 and a passage 4 leading to the working cylinders. The piston 5, which is arranged for reciprocation within the master control cylinder 2, may be acted upon by the driver of the vehicle by means of a conventional brake pedal. Upon the brake pedal being depressed, the piston 5 is displaced from the right to the left in Figure 1 against the force of an energy storing means which is in this embodiment constituted by a spring 6. Upon the brake pedal being released, the spring 6 will restore the piston 5 to its starting position. The preloading valve 7 is adapted to maintain the brake fluid throughout the hydraulic control system under a predetermined preload pressure. With the piston 5 in its starting position, the valve 7 will open whenever the pressure of the brake fluid present between the piston 5 and the pistons of the working cylinders is of sufficient magnitude to overcome the force of the spring acting upon the valve member of the preloading valve 7. In the latter case a certain amount of brake fluid will be transferred from the cylinder space 2 to the reservoir 3 via the valve 7.

The invention does not relate to the preloading valve 7 but rather the suction valve which is comprised of a valve body 8, a valve member 9 and a supporting member 10, the said valve being mounted in the body casting 1 between the reservoir 3 and the passage 4. This suction valve operates as will presently be described. The valve is adapted to close during the brake application stroke, i.e. during the displacement of the piston 5 in the cylinder 2 from the right to the left in Figure 1, the valve thus permitting the pistons in the working cylinders to be remote-controlled in a reliable manner. Upon the piston 5 being returned to its original position by the force of spring 6, the backflow of the brake fluid to the master control cylinder will be delayed to such an extent that a drop in pressure occurs in cylinder 2, causing the suction valve 8, 9, 10 to open and thus to allow an additional amount of brake fluid to flow from the reservoir 3 into the cylinder 2. This will restore the brake system instantly to readiness for operation in the event another brake application cycle should be initiated immediately.

The valve member 9, together with its upper projection 11 and its base portion 12, is made of rubber. However, this member may also be made of some other elastic organic material, for example of a suitable polymerization product. The upper projection 11 is guided in a suitably dimensioned recess 13 provided in the valve body 8, a bore 14 in communication with said recess permitting unimpeded relative movement.

The upper peg-like projection 11 is surrounded by a sheet-metal washer 15, this washer being adapted to obturate the flow passages 16 and 17 in the valve body 8 if acted upon by the valve member 9, the said washer then interrupting the flow of brake fluid from the reservoir 3 to the cylinder 2. To cause the peg-like projection 11 to be properly guided within the recess 13, the sheet-metal washer may have formed therein a pot-shaped extension made of the same material as the washer, said extension being press-fitted over the projection 11. Thus, the metallic pot-shaped extension will slide relatively to the walls of the recess 13 in the valve body 8 whenever the peg-like projection 11 moves in relation to the valve body 8.

It is of importance as regards the operation of the suction valve 8, 9, 10 that the circumferential portion 18 of the under surface of the valve body 8 should be inclined at a suitable angle towards that surface of the valve member 9 which faces the valve body 8. Since the valve member 9 is clamped in position between the valve body 8 and the apertured supporting member 10 spaced a fixed distance from the former, the upper circumferential edge of the valve member 9 co-operates with the valve body just described in such a manner as to open and close, respectively, the said suction valve. As will be seen in Figure 1, the central portion of the valve member 9, which is constituted by the base portion 12, rests on the supporting member 10. It will be appreciated that the valve member 9 of elastic material is constantly subjected to a slight preload between the inclined annular surface 18 and the supporting member 10. Depending on the pressure prevailing in cylinder 2, the valve member 9 is urged against the valve body 8 by a greater or smaller force. In the presence of a high pressure in the cylinder 2, such as is the case during a brake-application cycle, the valve member 9 will be strongly forced against the body 8, the sheet-metal washer 15 then obstructing the passages 16 and 17 leading to the reservoir 3, the said washer simultaneously functioning to prevent the elastic material of the valve member 9 from being forced into the said passages. An additional reliable sealing effect is produced by the upper edge of valve member 9 being urged into contact with the inclined surface 18 on the under side of valve body 8. Upon the pressure in cylinder 2 being sufficiently reduced, the ports 16 and 17 will be uncovered by the washer 15 and the edge of valve member 9 moving towards the supporting member 10. In the latter case, brake fluid from reservoir 3 may enter into the cylinder 2 via the passages 16 and 17 in the valve body 8, the clearance created between the inclined surface 18 and the upper edge of valve member 9 and the apertures 19 and 20 provided in the supporting member 10.

The fixed distance between the supporting member 10 and the under surface of the valve body 8 is provided for by placing the disc-like supporting member 10 on the edge of a suitably dimensioned bore in the body casting 1 and by screwing the valve body 8 into the body casting 1 after first having inserted into it, i.e. the valve body, the valve member 9 carrying a peg-like projection 11 and a base portion 12, and after providing a gasket 21 between the body casting 1 and the valve body 8.

In the embodiment illustrated in Figures 2 and 3, a valve of substantially the same construction as that of Figure 1 is arranged in the bottom of a master control cylinder 25, the said valve again comprising a valve body 22, a valve member 23 and a supporting member 24. The passages 26 and 27 in the valve body 22 are in communication with a brake fluid reservoir (not shown) via an annular chamber 28 and a gallery 29 provided in the body casting 30. In this embodiment the passage 31 leading to the working cylinders is provided in the upper portion of the master control cylinder 25.

The supporting member 24 differs from that of Fig. 1 in that the former is of substantially pot-like design. As will be seen in Figure 2, the supporting member 24 has an outwardly extending flange 32 which is clamped in position between the end face of the bore in which it is located in the body casting 30 and the inner end face of the valve body 22.

Figure 4 illustrates another modification of the supporting member 33 and the co-operating portion of the valve body 34, the inner end face of the latter having an annular projection 35 which, when brought into contact with the supporting member 33 which in this instance is of disc-like formation, defines the fixed distance between the mouths of the passages 36 and 37 in the valve body 34 and the supporting member 33, thus also determining the preload to which the valve member 38 is subjected.

Figure 5:
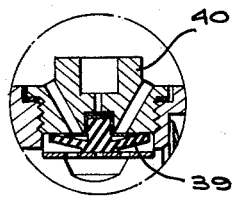
Figures 5, 6 and 7 show further modified embodiments of the valve member in conjunction with the remaining valve structure.
Figure 6:
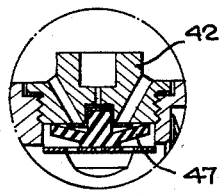
Figure 7:
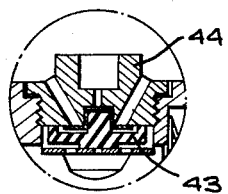
Figure 8:
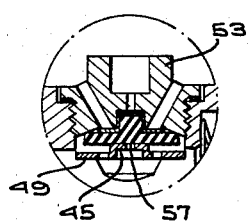
Figure 9:
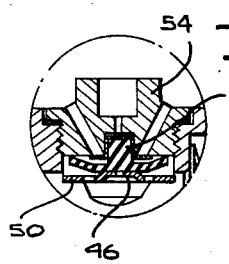
Figure 10:
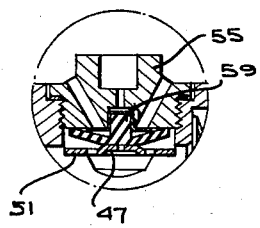
Figure 11:
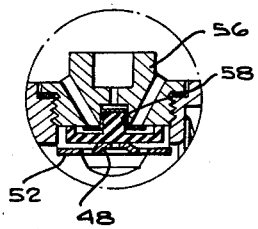

In the embodiments illustrated in Figures 5, 6 and 7, the respective valve members 39, 41 and 43 are of cup-like design. The valve member 39, for instance, is cambered, its concave side facing the valve body 40. In Figure 6 the valve member 41 is of conical shape, the open side of the cone facing the valve body 42. In the embodiment of Figure 7 the valve member 43 resembles a cup, the inside of the cup being opposite the valve body 44. The valve members 39, 41 and 43 of these embodiments function in the same manner as those described in connection with Figures 1, 2 and 4, the only difference being that in view of the cup-like shape of the valve members in the last-described embodiments the provision of the inclined surface 18 on the under side of the valve body 8 may be dispensed with.

Figures 8 to 11 show valves having valve members in which the base portion referred to above has been omitted. Instead, the central portions of the supporting members 49, 50, 51, 52 are formed as depressions 45, 46, 47, 48, respectively, the said depressions extending, in cup-like formation, towards their respective 53, 54, 55, 56. Otherwise the valve members 57, 58, 59, 60 resemble those of Figures 1 and 5 to 7, respectively.

Figure 12 illustrates still another embodiment which is characterized by the fact that it constitutes a self-contained structural unit. It includes a supporting member 61 in the shape of an annular pot, the central upturned wall of which (indicated at 62) surrounds the cylindrical base portion 63 of the valve member 64. The upper rim of the said central wall also functions to support the disc-like portion of the valve member 64. The external wall 62' of the supporting member is secured to the valve body 65 by turning in or rolling in the upper edge of said external wall. The recess 66 of the valve body 65 serves to guide the metallic central projection 67 which is formed integrally with the sheetmetal washer 68.

Formed in that end of the valve body 65 which faces away from the valve member 64 is a polygonal recess 69 adapted to receive a suitable tool serving to install the complete valve unit in the tapped hole provided in the body casting 70.

I claim:

1. A valve for use in a hydraulic control system of an automotive vehicle comprising a valve body having bores therethrough, a supporting element defining a plurality of apertures fixed in spaced relation to said valve body, valve means, including a substantially disc-shaped valve member made of elastic organic material and being arranged between said valve body and said supporting element, with a slight preload existing in the valve member between its rim thereby normally sealingly pressed against the sealing surface of said valve member and the part of said valve member which rests against said supporting element, said valve member being free to move towards said valve body when heavy pressure is exerted through the apertures of said supporting element, and a sheet metal washer arranged between said valve member and said valve body and free to move against said valve body when said valve member is heavily pressed towards said valve body to prevent extrusion of the material of said valve member through the bores of said valve body, said valve means and said valve body defining a first mutually coacting means for guiding said valve means in a substantially linear path during movement of said valve means towards said valve body and said valve means and said supporting element defining a second mutually coacting means located on the side of said valve means opposite said first mutually coacting means to space said valve means from the apertures of said supporting element, said second mutually coacting means providing said preload of said valve member and preventing the restriction of said apertures by said valve member.

2. A valve as defined in claim 1, wherein said first mutually coacting guiding means consists of a centrally located cylindrical projection on said elastic valve member and a recess in said valve body, said recess being cylindrical in cross section and in which said cylindrical projection is received.

3. A valve as defined in claim 2, wherein said valve body defines a bore extending from the end of said cylindrical recess to its side remote from said valve means.

4. A valve as defined in claim 2, wherein said sheet metal washer has formed thereon a pot-like projection which fits over said cylindrical projection.

5. A valve as defined in claim 1, wherein said sheet metal washer has a centrally located cylindrical metallic projection, and wherein said valve body defines a recess cylindrical in cross section in which said metallic projection is received.

6. A valve as defined in claim 5, wherein said valve body defines a bore extending from the end of said cylindrical recess to its side remote from said valve means.

7. A valve as defined in claim 5, wherein said elastic valve member has a cylindrical projection formed on its surface facing said supporting element.

8. A valve as defined in claim 7, wherein said supporting element is in the form of an annular pot having a cylindrical wall which serves to guide said cylindrical projection and to support by its rim said valve means, the external wall of said supporting element being secured to said valve body.

9. A valve as defined in claim 1, wherein said supporting element is deformed to define a projection extending toward said valve means.

10. A valve as defined in claim 1, wherein said circumferential portion of the surface of said valve body facing toward said valve means is inclined toward said valve means.

11. A valve as defined in claim 1, wherein said elastic valve member is of dish-like formation.

References Cited in the file of this patent

UNITED STATES PATENTS

| | | |
|---|---|---|
| 1,077,415 | Massey | Nov. 4, 1913 |
| 1,785,259 | Hickerson | Dec. 16, 1930 |
| 2,128,050 | Landis | Aug. 23, 1938 |
| 2,168,695 | Asari | Aug. 8, 1939 |
| 2,211,212 | Langdon | Aug. 13, 1940 |
| 2,574,969 | Heidloff | Nov. 13, 1951 |
| 2,671,466 | Conrad | Mar. 9, 1954 |

FOREIGN PATENTS

| | | |
|---|---|---|
| 292,495 | Italy | of 1932 |
| 795,527 | France | of 1936 |
| 672,427 | Great Britain | May 21, 1952 |